United States Patent
Stolarchuk et al.

(10) Patent No.: US 9,600,263 B2
(45) Date of Patent: Mar. 21, 2017

(54) SYSTEMS AND METHODS FOR PERFORMING UNINTERRUPTED NETWORK UPGRADES WITH CONTROLLERS

(71) Applicant: Big Switch Networks, Inc., Santa Clara, CA (US)

(72) Inventors: Michael Stolarchuk, Ypsilanti, MI (US); Carl D. Roth, Santa Cruz, CA (US); Alok Shankar, Mountain View, CA (US); Robert K. Vaterlaus, Oakland, CA (US); Srinivasan Ramasubramanian, Sunnyvale, CA (US); Andreas Wundsam, Berkeley, CA (US); Robert W. Sherwood, Oakland, CA (US); Rajneesh Bajpai, San Jose, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 0 days.

(21) Appl. No.: 14/337,193

(22) Filed: Jul. 21, 2014

(65) Prior Publication Data
US 2016/0019044 A1 Jan. 21, 2016

(51) Int. Cl.
G06F 9/445 (2006.01)
H04L 12/24 (2006.01)
H04L 29/08 (2006.01)

(52) U.S. Cl.
CPC ............. *G06F 8/65* (2013.01); *G06F 8/61* (2013.01); *G06F 8/63* (2013.01); *H04L 41/082* (2013.01); *H04L 67/34* (2013.01)

(58) Field of Classification Search
None
See application file for complete search history.

(56) References Cited

U.S. PATENT DOCUMENTS 7,430,735 B1 * 9/2008 Balakrishnan et al. ...... 717/173
7,577,098 B2 * 8/2009 Tamura et al. ............... 370/242
(Continued)

OTHER PUBLICATIONS

"Ethernet Fault Tolerance and Redundancy." DeltaV. Emerson Process Mangement, Mar. 2007. Web. May 13, 2015. <http://www2.emersonprocess.com/siteadmincenter/PM%20DeltaV%20Documents/Whitepapers/WP_EthernetRedncy.pdf>.*
(Continued)

*Primary Examiner* — Wei Zhen
*Assistant Examiner* — Binh Luu
(74) *Attorney, Agent, or Firm* — Treyz Law Group, P.C.; Michael H. Lyons

(57) ABSTRACT

First and second controllers implemented on computing equipment may be used to control switches in a network. The switches may forward network packets between end hosts. The second controller may identify first and second redundant partitions of switches in the network that are each coupled to all of the end hosts. The first controller may instruct the first partition to install software while the second partition forwards network traffic and may instruct the second partition to install software while the first partition forwards network traffic. The first controller may install the software while the second controller is active and the second controller may install the software while the first controller is active. In this way, the switches and controllers may be provided with an uninterrupted software upgrade and packets may be forwarded between end hosts during the software upgrade without introducing packet loss or other noticeable reductions in network performance.

24 Claims, 13 Drawing Sheets

(56) References Cited

U.S. PATENT DOCUMENTS

| | | |
|---|---|---|
| 8,000,697 B1 | 8/2011 | Duck |
| 8,254,950 B2 | 8/2012 | De Pasquale et al. |
| 8,495,618 B1* | 7/2013 | Inbaraj et al. ............... 717/173 |
| 8,605,734 B2 | 12/2013 | Ichino |
| 8,717,874 B2 | 5/2014 | Ghosh et al. |
| 8,943,490 B1* | 1/2015 | Jain et al. .................... 717/168 |
| 9,008,080 B1* | 4/2015 | Mehta .................... H04L 49/60 370/327 |
| 2007/0174686 A1* | 7/2007 | Douglas et al. ............... 714/13 |
| 2009/0144720 A1 | 6/2009 | Roush et al. |
| 2010/0169574 A1* | 7/2010 | Yamasaki et al. ............ 711/114 |
| 2011/0286324 A1* | 11/2011 | Bellagamba et al. ........ 370/219 |
| 2012/0072894 A1* | 3/2012 | Wang ...................... G06F 8/65 717/168 |
| 2012/0281698 A1* | 11/2012 | Forster et al. ................ 370/392 |
| 2013/0010600 A1* | 1/2013 | Jocha et al. ............... 370/236.2 |
| 2013/0070762 A1* | 3/2013 | Adams et al. ................ 370/389 |
| 2013/0097335 A1* | 4/2013 | Jiang et al. ................... 709/245 |
| 2014/0059530 A1* | 2/2014 | Banavalikar .......... G06F 9/4406 717/170 |
| 2014/0269683 A1 | 9/2014 | Bhagavathiperumal et al. |
| 2014/0281669 A1 | 9/2014 | DeCusatis et al. |

OTHER PUBLICATIONS

Portolani, Maurizio, and Mauricio Arregoces. "Data Center Design Overview." CiscoPress.com. Cisco, Dec. 31, 2003. Web. May 13, 2015. <http://www.ciscopress.com/articles/article.asp?p=102268&seqNum=3>.*

Moxa, "Redundancy in Automation." Automation. Moxa Networking Inc., Oct. 13, 2003. Web. Feb. 3, 2016. <http://www.automation.com/pdf_articles/RedundancyinAutomation.pdf>.*

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | | SEND TO PORT 3 |
| * | * | * | * | 172.12.3.4 | * | * | ⋮ | SEND TO PORT 4 |
| * | * | * | * | * | * | 80 | | DROP |

FIG. 4

SYSTEMS AND METHODS FOR PERFORMING UNINTERRUPTED NETWORK UPGRADES WITH CONTROLLERS

BACKGROUND

This relates to communication networks, and more particularly, to communications networks having network switches that are controlled by a controller.

Packet-based networks such as the Internet and local data networks that are connected to the internet include network switches. Network switches are used in forwarding packets from packet sources to packet destinations. The packets may be sometimes referred to as frames. For example, data is forwarded over layer 2 of the Open Systems Interconnection (OSI) model as frames (e.g., Ethernet frames), whereas data is forwarded over layer 3 of the OSI model as packets (e.g., Internet Protocol packets).

It can be difficult or impossible to configure the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Over time, software that is implemented by the switches and controller servers on the network may need to be updated to a newer version of the software. In order to update software running on the network, the controller and switches need to be rebooted to complete installation of the updated software. If care is not taken, rebooting the switches and/or controller can cause interruptions to data forwarding services provided by the network. It may therefore be desirable to be able to provide improved systems and methods for updating software on communications networks.

SUMMARY

First and second controllers implemented on computing equipment may be used to control switches in a network (e.g., by providing control messages that include packet forwarding rules such as flow table entries to the switches over control paths). The switches may be connected to end hosts and may forward network data packets between the end hosts.

The first controller may communicate with the second controller to perform a software upgrade operation on the network. The switches in the network may forward network traffic between the end hosts during the software upgrade operation. The second controller may identify at least first and second redundant partitions of switches in the network that are each coupled to all of the end hosts. At least one of the first and second controllers may load (e.g., pre-load) software (e.g., updated, upgraded, or new software) onto the first and second redundant partitions (e.g., first and second redundant groups or sets) of switches.

The first controller may instruct the first redundant partition of switches to install the loaded software and the second redundant partition of switches may continue to forward network traffic (e.g., network data packets) between the end hosts while the first redundant partition of switches installs the loaded software. The first controller may instruct the second redundant partition of switches to install the loaded software after the first redundant partition has completed installation of the loaded software. The first redundant partition of switches may continue to forward network traffic between the end hosts while the second redundant partition of switches installs the loaded software.

If desired, the second controller may instruct the first and second redundant partitions of switches to disable connections between the first and second redundant partitions. If desired, the second controller may instruct each of the switches in the first and second redundant partitions of switches to disable a respective connection with the first controller and the first controller may install the software on the first controller after each of the switches in the first and second redundant partitions of switches have disabled the respective connections with the first controller.

The second controller may instruct the first redundant partition of switches to enable (e.g., re-enable) the disabled connections between the first redundant partition of switches and the first controller prior to instructing the first redundant partition of switches to install the loaded software using the first controller. The second controller may instruct the second redundant partition of switches to enable the disabled connections between the second redundant partition of switches and the first controller prior to instructing the second redundant partition of switches to install the loaded software using the first controller. If desired, the second controller may install the software while the second redundant partition of switches installs the loaded software.

The first controller may receive network topology information identifying connections in the network from the second controller and may translate the received network topology information to updated software definitions specified by the installed (updated) software. The first controller may generate network forwarding rules such as flow table entries based on the network topology information and may provide the flow table entries to the switches for performing data forwarding through the network. After performing the software upgrade, the first controller may generate additional network forwarding rules such as additional flow table entries using the translated network topology information (e.g., the network topology information translated using the updated software definitions) and may provide the additional flow table entries to the switches after the switches have installed the upgraded software. The switches may process the additional flow table entries and may forward data traffic through the network using the received additional flow table entries.

By performing the software upgrade operations on one controller at a time and one redundant partition of switches at a time, packets may be forwarded between end hosts during the software upgrade operations without a noticeable reduction in network forwarding performance (e.g., without a level of packet loss that is detectable by a user of the end hosts).

Further features of the present invention, its nature and various advantages will be more apparent from the accompanying drawings and the following detailed description.

BRIEF DESCRIPTION OF THE DRAWINGS

FIG. 4 is a diagram of an illustrative flow table of the type that may be used by a packet processing system showing three illustrative types of packet forwarding that may be performed based on the flow table entries of the flow table in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller such as a controller server or distributed controller server may interact with each of the control clients over respective network links. The use of a cross-platform controller and corresponding controller clients allows potentially disparate network switch equipment to be centrally managed.

Figure 1:
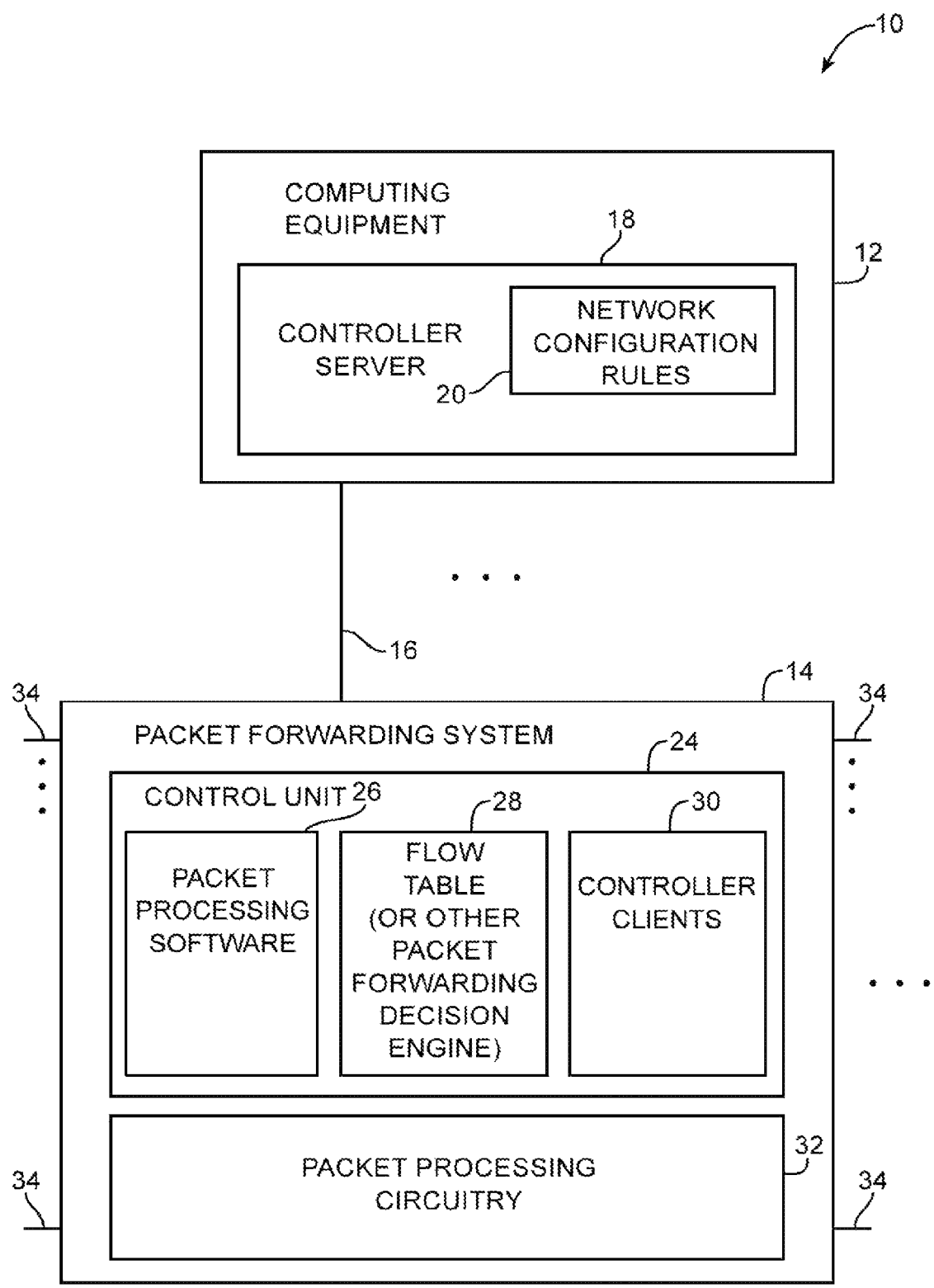
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes (e.g., two or more controllers). Arrangements in which first and second controller servers are used to control a network of associated switches are sometimes described herein as an example.

A given controller server such as controller server 18 as shown in FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. As another example, rules 20 may include policies restricting communication between particular end hosts in network 10. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0, 1.3.1, or other versions of the OpenFlow protocol). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Any desired switch may be provided with controller clients that communicate with and are controlled by a controller server. For example, switch 14 may be implemented using a general purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. The controller server may, if desired, be implemented on one or more line cards in the rack-based system, in another rack-based system, or on other computing equipment that is coupled to the network.

Figure 2:
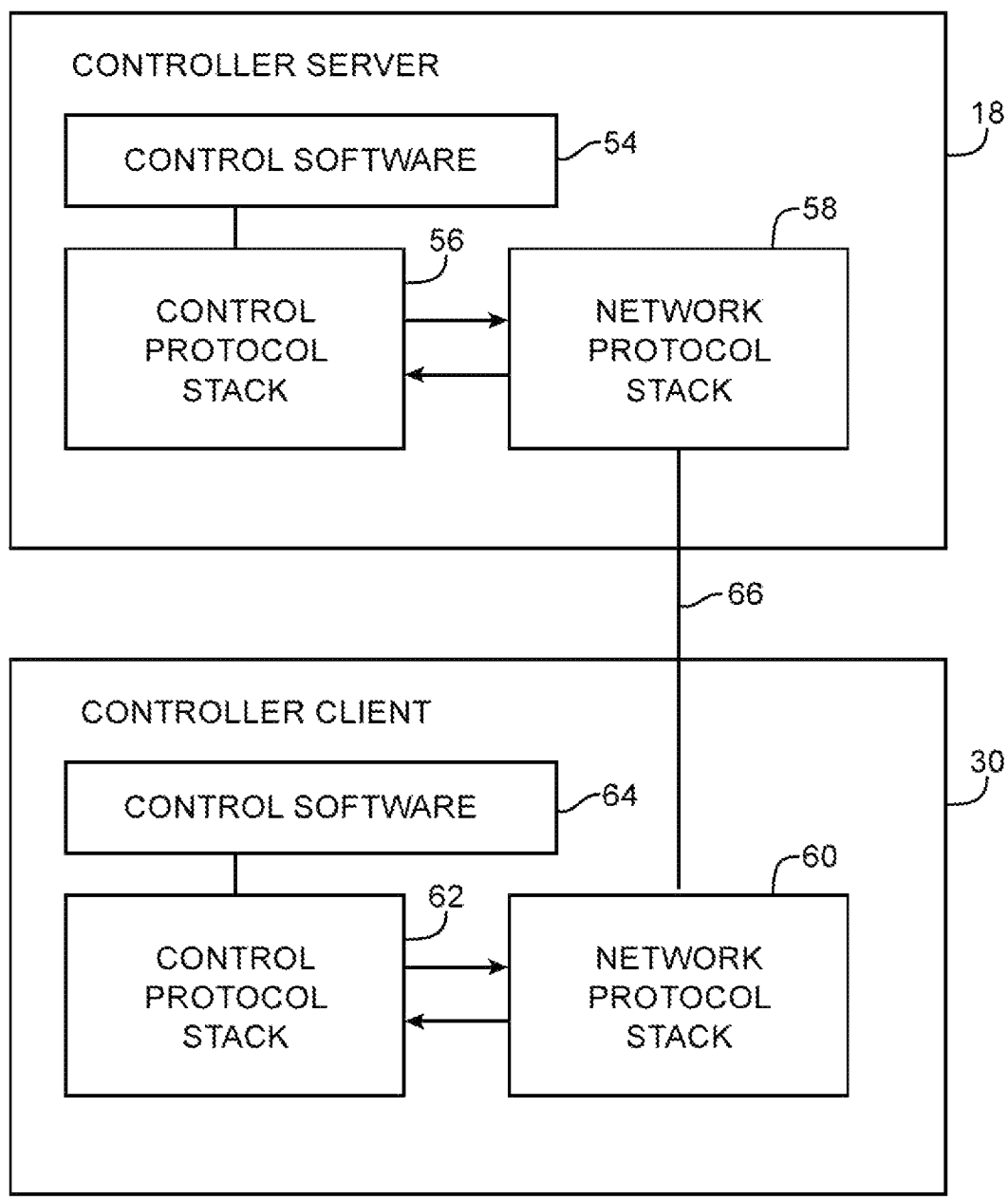
FIG. 2 is a diagram of a controller server and controller client that may communicate over a network connection in accordance with an embodiment of the present invention.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 2, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 3:
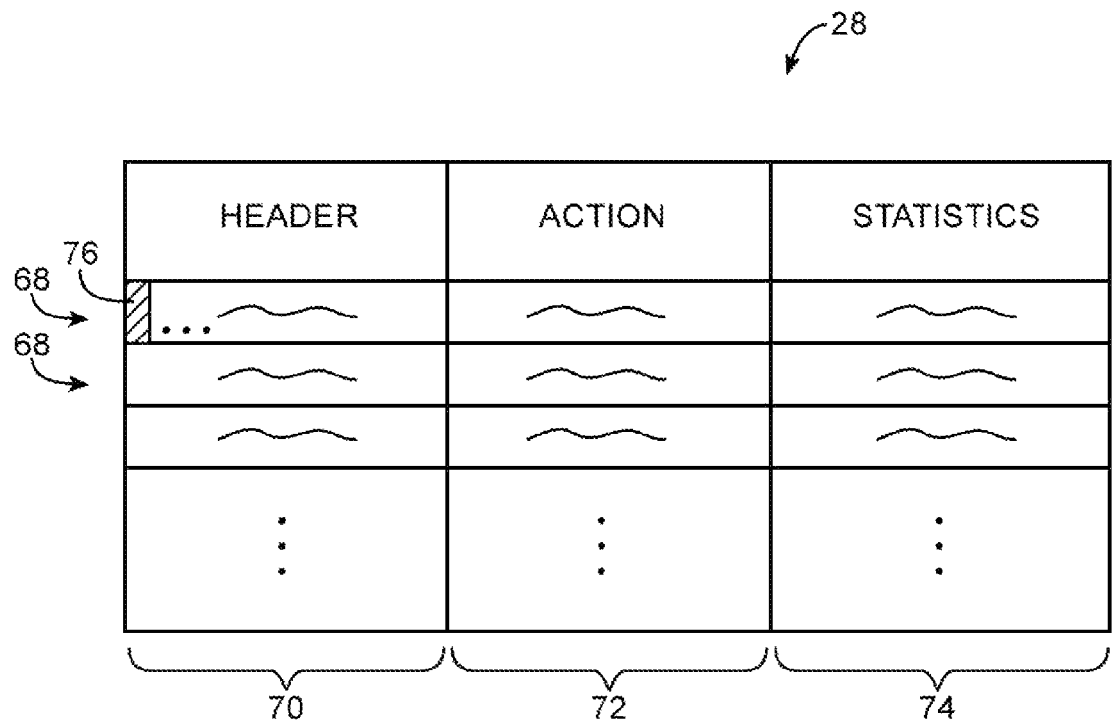
FIG. 3 is a diagram of an illustrative flow table of the type that may be used by a packet processing system in accordance with an embodiment of the present invention.

An illustrative flow table is shown in FIG. 3. As shown in FIG. 3, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match the flow table entry.

FIG. 4 is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 4 table directs the switch in which the flow table entry is operating to perform Ethernet switching. In particular, incoming packets with matching Ethernet destination addresses are forwarded to port 3.

The entry of the second row of table of FIG. 4 illustrates how a switch may be configured to perform internet routing (i.e., packets are forwarded based on their destination IP address).

The third row of the table of FIG. 4 contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 4 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 5:
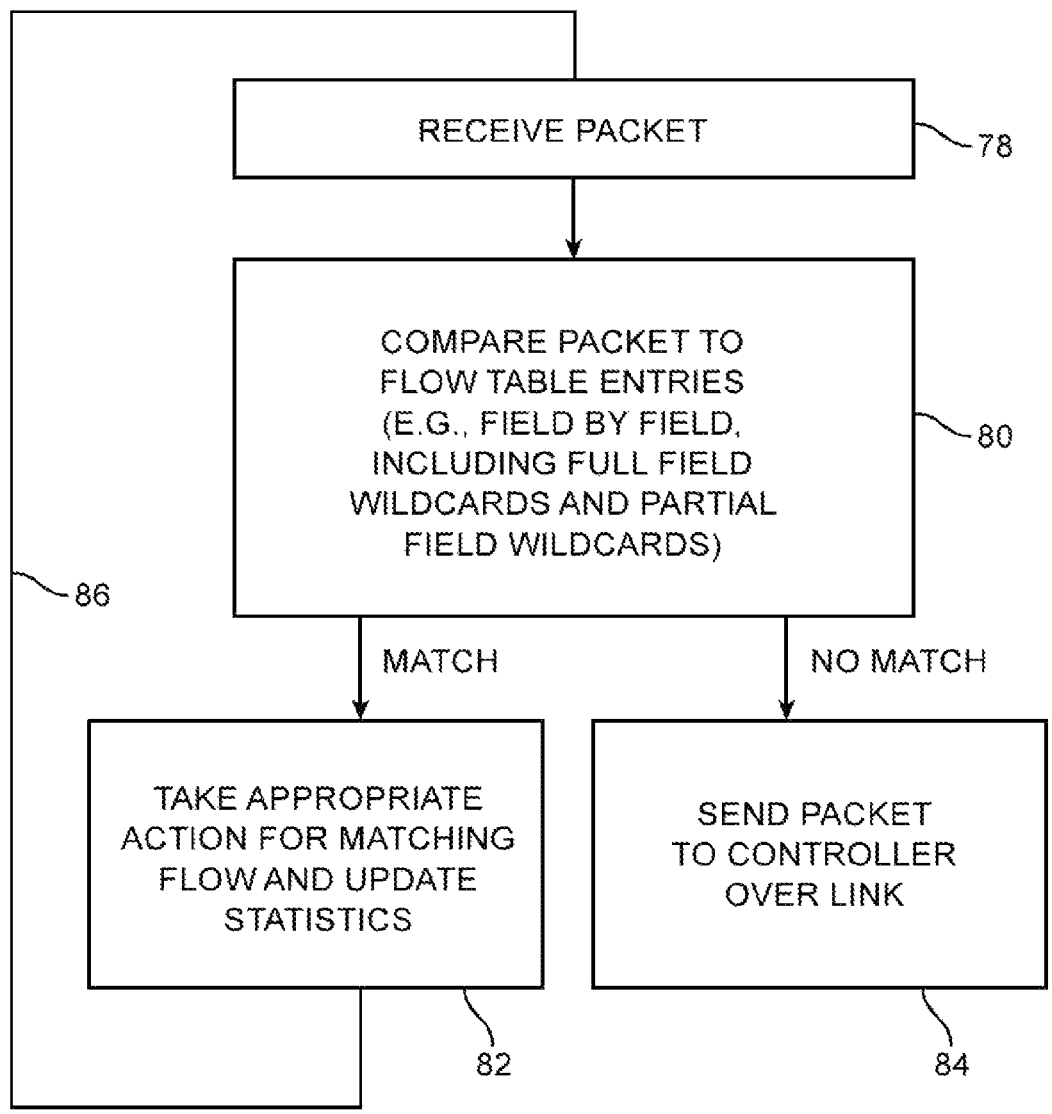
FIG. 5 is a flow chart of illustrative steps involved in processing packets in a packet processing system in accordance with an embodiment of the present invention.

Illustrative steps that may be performed by switch 14 in processing packets that are received on input-output ports 34 are shown in FIG. 5. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 6:
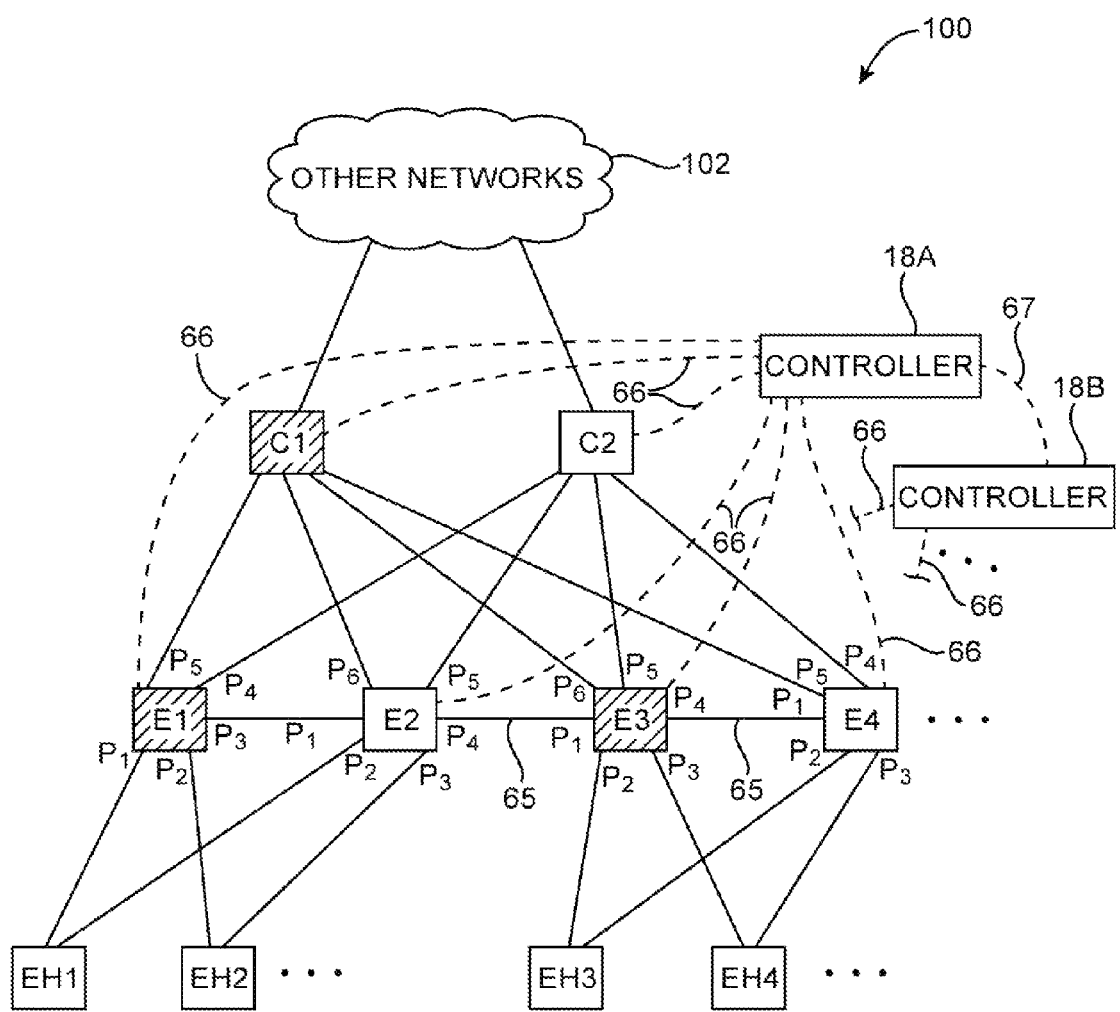
FIG. 6 is a diagram of an illustrative network having switches that may be controlled by multiple controllers to perform software upgrade operations in accordance with an embodiment of the present invention.

FIG. 6 is a diagram of an illustrative network 100 in which switches may be controlled by controllers 18 (e.g., a first controller 18A and a second controller 18B). Controllers 18A and 18B may each be a controller server or a distributed controller implemented across multiple computing devices. In another suitable arrangement, controllers 18A and 18B may be formed on shared computing equipment. As shown in FIG. 6, network 100 may include switches such as switches C1, C2, E1, E2, E3, and E4. Controllers 18A and 18B may each be coupled to the switches of network 100 via control paths 66 (e.g., each switch in network 100 may be connected to both controllers 18A and 18B via control paths 66). Controllers 18A and 18B may control the switches using control paths 66 (e.g., by providing control messages such as control messages that include flow table entries 68 of FIG. 3). Controllers 18A and 18B may communicate with each other over path 67 (e.g., for coordinating software upgrade operations, for sharing network topology information, for coordinating which of the controllers is to actively control the switches on the network at any given time, etc.).

Network 100 may include end hosts such as end hosts EH1, EH2, EH3, and EH4 that are coupled to the switches of network 100. Switches that are directly coupled to end hosts may sometimes be referred to as edge switches, whereas switches that merely interconnect other switches and are not directly coupled to the end hosts may be referred to as core switches. In the example of FIG. 6, switches E1, E2, E3, and E4, are edge switches, because they are coupled to end hosts. Switches C1 and C2 are core switches, because switches C1 and C2 interconnect switches E1, E2, E3, and E4 and are not directly coupled to end hosts. Core switches such as switches C1 and C2 may couple network 100 to other networks 102 (e.g., other networks including switches and end hosts). If desired, switches of the same rack may be coupled by intra-rack paths. In the example of FIG. 6, switches E1, E2, E3, and E4 are coupled by paths 65.

Switches 14 in network 100 may be coupled to other switches 14 and end hosts EH through ports P (e.g., ports such as input-output ports 34 as shown in FIG. 1). As shown in the example of FIG. 6, a first edge switch E1 may forward data (e.g., network data packets) to and from end host EH1 via a first port $P_1$, may forward data to and from end host EH2 via a second port $P_2$, may forward data to and from a second edge switch E2 via a third port $P_3$ and a corresponding communications path 65, may forward data to and from core switch C2 via a fourth port $P_4$, and forward data to and from core switch C1 via fifth port $P_5$. Second edge switch E2 may forward data to and from end host EH1 via a corresponding port $P_2$, may forward data to and from edge switch E1 via a corresponding port $P_1$, etc.

The example of FIG. 6 in which edge switches are directly coupled to core switches are merely illustrative. If desired, additional switches may be interposed between the edge and core switches. In general, network 100 may include at least two controllers 18 (e.g., network 100 may include two controllers, three controllers, four controllers, or any other desired number of controllers). In general, there may be any desired number of end hosts, edge switches, core switches, and controllers implemented in network 100.

Figure 7:
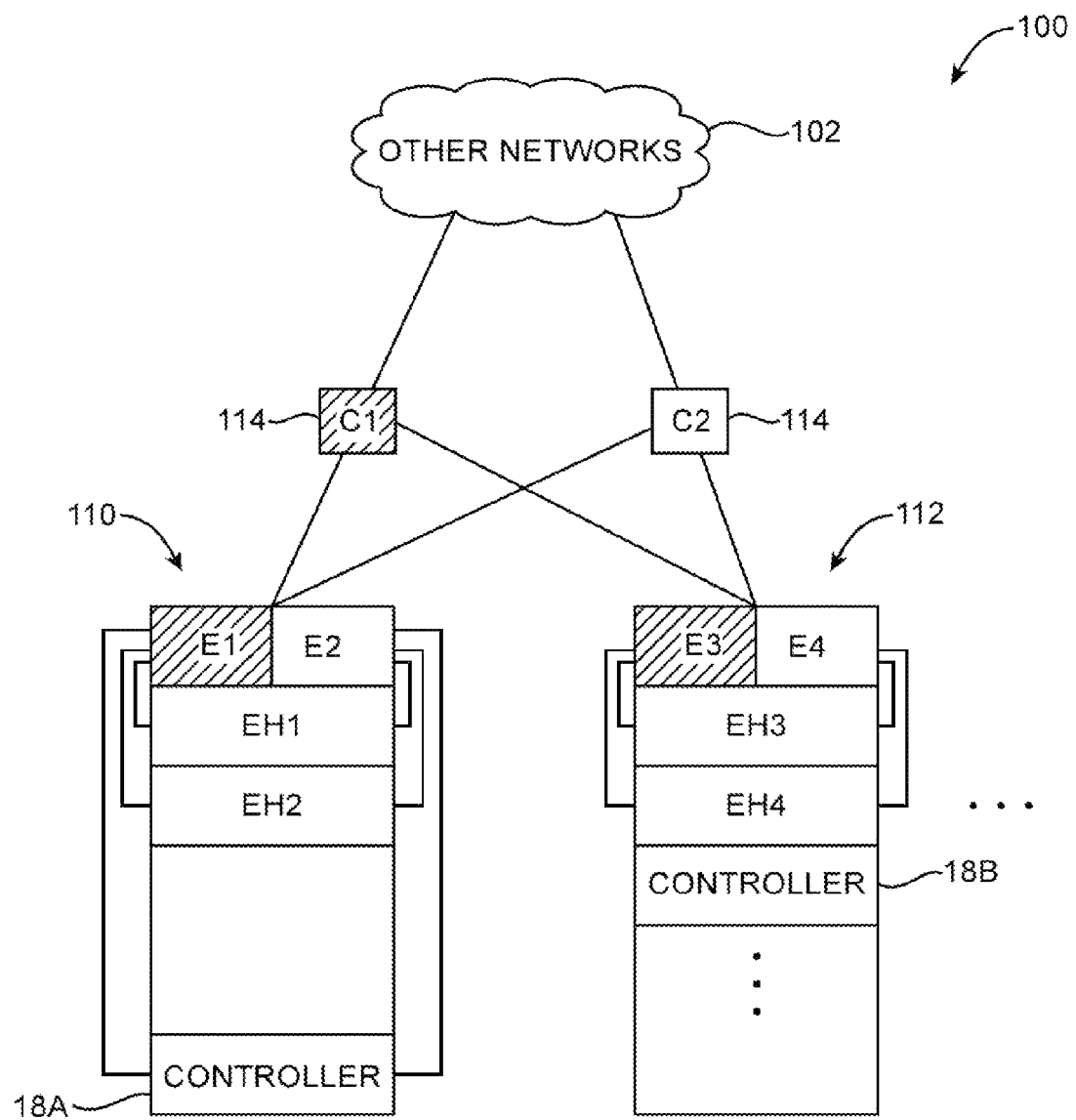
FIG. 7 is a diagram of an illustrative rack-based system that implements a network having switches that may be controlled by multiple controllers to perform software upgrade operations in accordance with an embodiment of the present invention.

FIG. 7 is an illustrative example of network 100 of FIG. 6 that is implemented using rack-based systems. As shown in FIG. 7, edge switches and end hosts may be implemented using network racks 110 and 112 that are coupled to switches 114 (e.g., core switches as shown in FIG. 7). If desired, network 100 may include additional network racks that house additional end hosts and switches and that are coupled to core switches 114. Network rack 110 may include edge switches E1 and E2 and end hosts EH1 and EH2, whereas network rack 112 may include edge switches E3 and E4 and end hosts EH3 and EH4. Edge switches E1, E2, E3, and E4 may serve as top-of-rack switches that are coupled via network paths to each end host of the corresponding network rack 112. For example, top-of-rack switch E3 is connected to each of the end hosts of network 112 (e.g., end hosts EH3 and EH4).

Each top-of-rack switch serves as an interface between end hosts of the corresponding network rack and other network devices such as other portions of network 100 or other networks 102. Network traffic to or from end hosts of network rack 110 may be required to traverse at least one of the top-of-rack switches of network rack 110 (e.g., top-of-rack switches E1 and E2). Similarly, network traffic of network rack 112 may be required to traverse at least one of switches E3 and E4. As an example, network packets sent by end host EH1 to end host EH3 may be forwarded by top-of-rack switch E1, core switch C1, and top-of-rack switch E3. As another example, network packets sent by end host EH1 to end host EH3 may be forwarded by top-of-rack switch E2, core switch C1, and top-of-rack switch E4.

As shown in FIG. 7, controller 18A may be implemented in network rack 110 (e.g., using the resources of a line card or other computing equipment of network rack 110). Controller 18A may communicate with the top-of-rack switches and core switches by sending control packets and receiving control plane packets from the switches. In this scenario, one or more switches of network 100 may form portions of control paths 66 of FIG. 6. For example, switch E1 or switch E2 may serve as part of control paths between core switches C1 and C2 and controller 18A. As another example, switches E1, E2, C1, C2, and C3 may form portions of control paths between controller 18 and switches E3 and E4.

Controller 18B may be implemented in network rack 112 (e.g., using the resources of a line card or other computing equipment of network rack 112). Controller 18B may communicate with the top-of-rack switches and core switches by sending control packets and receiving control plane packets from the switches. This example is merely illustrative. If desired, controller 18B and controller 18A may both be formed on rack 110, may both be formed on rack 112, or one or both of controllers 18A and 18B may be formed on additional network racks (not shown).

Edge switches such as E1, E2, E3, and E4 that are coupled to multiple end hosts are sometimes referred to as leaf switches. For example, top-of-rack switches in a rack-based system are sometimes referred to as leaf switches. Switches 114 that are coupled to each of the leaf switches are sometimes referred to as spine switches. Spine switches may be core switches that are not connected to any end hosts (e.g., as shown in FIG. 7) or may have one or more ports that are connected to end hosts. The example of FIG. 7 is merely illustrative. If desired, racks 110 and 112 may include any desired number of leaf switches, end hosts, and controllers. Network 100 may include any desired number of network racks.

Software may be implemented on controllers 18A and 18B and switches 14 in network 100 for performing and controlling data forwarding through the network. Software running on network 100 may include, for example, packet processing software 26 implemented on switches 14 (as shown in FIG. 1), control software 54 implemented on controller 18 (as shown in FIG. 2), control software 64 implemented on switches 14, software for generating and implementing flow table entries based on desired network rules or policies, or any other desired software running on controllers 18 and/or switches 14 (e.g., operating system software, forwarding software, control software, etc.).

Over time, software implemented on network 100 may need to updated or upgraded (e.g., to a latest software version or build, to incorporate additions or changes to the functionality of network 100, to implement updated or new communications protocols, etc.). In order to update the software running on network 100, switches 14 and/or controllers 18 may obtain new software (e.g., updated or upgraded software) from an external source (e.g., provided by a user or network administrator, received over other networks 102, etc.). The software may be, for example, a software image or other information for configuring switches 14 and controller 18. Switches 14 and controllers 18 may install the updated software and may subsequently use the updated software for performing data forwarding operations through the network. In order to properly implement the updated software, switches 14 and controllers 18 typically need to be temporarily disabled (e.g., rebooted) after installation of the updated software. If care is not taken, rebooting switches 14 and/or controller 18 may interrupt or delay data forwarding through network 100 (e.g., rebooting switches and controllers on network 100 may cause undesirable packet loss).

As an example, consider a scenario in which switches E1 and E2 as shown in FIG. 6 simultaneously reboot after installing new software. In this scenario, end hosts EH1 and EH2 are simultaneously disconnected from network 100 while rebooting and are unable to communicate with the rest of the network while switches E1 and E2 reboot. This interruption may be noticeable and objectionable to a user of end hosts EH1 or EH2. Interruptions to the network caused by the software update operations may generate a network performance reduction (e.g., packet loss) or network performance "hit" that is noticeable to a user of end hosts EH. A noticeable network hit may be defined herein as any increase in the time required to forward a packet from a packet source to a packet destination through network 100 that exceeds a timeout period associated with applications running on end hosts EH (e.g., any time greater than an application timeout period of approximately 3-5 seconds, greater than an application timeout period of approximately 30 seconds, etc.). It may therefore be desirable to be able to provide improved systems and methods for upgrading software implemented on communications network 100.

If desired, controllers 18A and 18B may actively manage upgrade operations for network 100 so that any performance reduction caused by the upgrade operations are unnoticeable or "hit-less" to a user of the network. For example, controllers 18A and 18B may utilize connection redundancy in network 100 to ensure that end hosts EH are always connected to network 100 as switches 14 install updated software and to mitigate the effects of any performance loss resulting from the upgrade process.

As shown in FIG. 6, each end host EH may be connected to at least two different edge switches and each edge switch is connected to every core switch in network 100. In this way, each end host EH may be redundantly connected to network 100 (e.g., so that if one of the edge switches connected to a particular end host needs to reboot, another edge switch remains connected to that end host for forwarding data packets between that end host and other end hosts in network 100). By forming network 100 with at least two controllers 18 (e.g., with a first controller 18A and a second controller 18B), a given one of the controllers can control (manage) data flow through network 100 while the other controller(s) reboots to install upgraded software. By coordinating upgrade operations on network 100, controllers 18A and 18B may minimize any reduction in data forwarding performance generated by the upgrade process.

Figure 8:
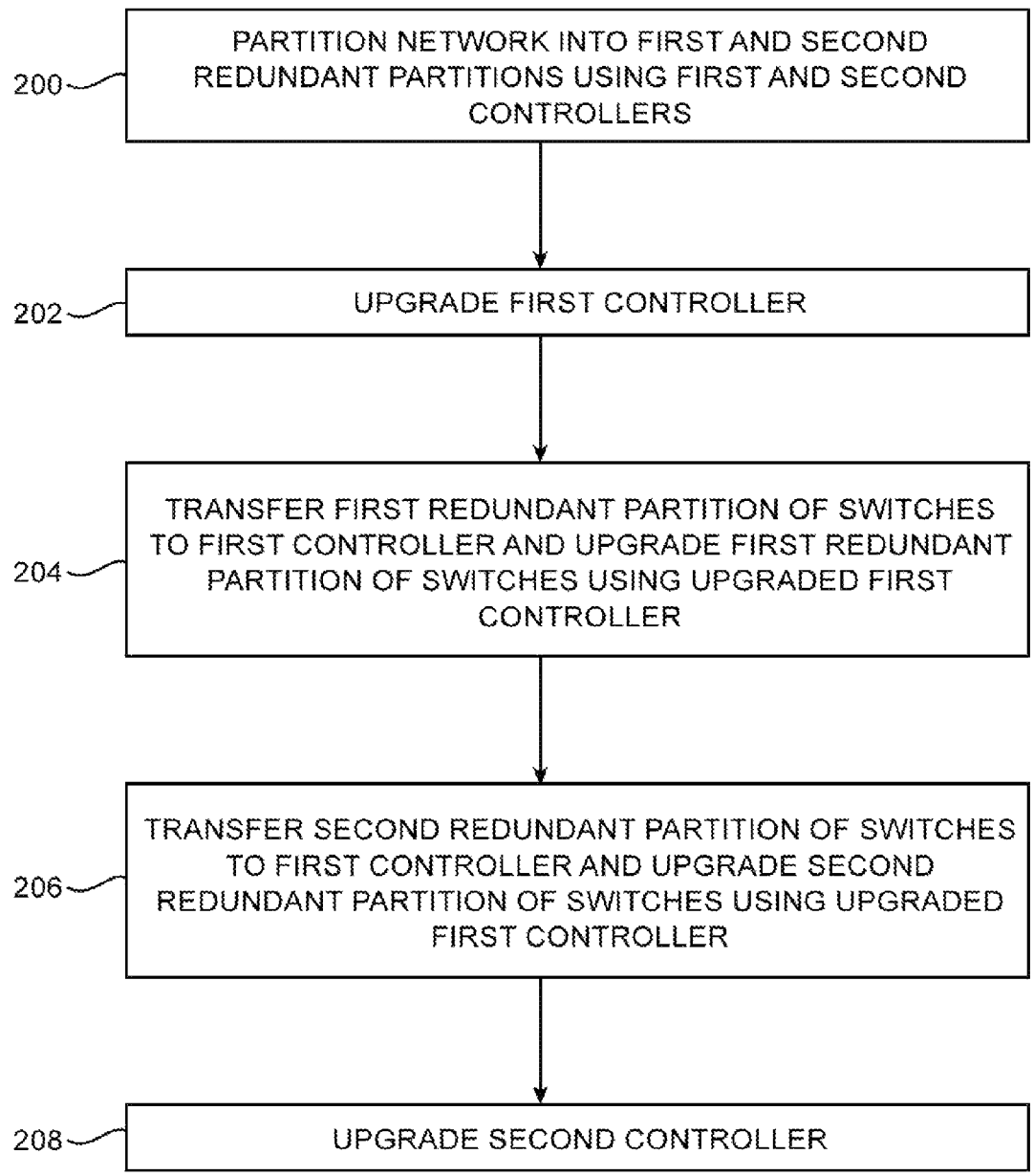
FIG. 8 is a flow chart of illustrative steps involved in upgrading software on a network using multiple controllers without data forwarding interruptions in accordance with an embodiment of the present invention.

FIG. 8 is a flow chart of illustrative steps that may be performed by controllers such as controllers 18 for performing uninterrupted (seamless) software upgrade operations on the network (e.g., upgrade operations that do not noticeably impact the performance of the network in forwarding data between end hosts). The steps of FIG. 8 are described in connection with the example of FIG. 6 for performing upgrade operations using two controllers 18A and 18B on switches 14 in network 100. This is merely illustrative and does not serve to limit the scope of the present invention. If desired, the steps of FIG. 8 may be performed using any desired communications network having any desired number and arrangement of controllers, switches, and end hosts.

At step 200, controller 18A and/or controller 18B may partition network 100 into redundant first and second partitions of switches. Controllers 18 may identify different groups (sets) of respective switches that are each connected to all of the end hosts EH in the network. In the example of FIG. 6, controllers 18 may identify a first redundant partition of switches (sometimes referred to herein as a partition of switches, a redundant set of switches, a set of switches, a redundant group of switches, or a group of switches) that includes the switches E1, E3, and C1 (i.e., the shaded switches shown in FIG. 6), and a second redundant partition of switches that includes switches E2, C2, and E4 (i.e., the unshaded switches shown in FIG. 6). The first and second partitions of switches shown in FIG. 6 are each coupled to all of the end hosts EH in network 100 via network paths that are not formed as a part of the other partition of switches (e.g., the first partition of switches is coupled to all of end hosts EH1 over paths that are not a part of the second partition and the second partition of switches is coupled to all of end hosts EH1 over paths that are not a part of the first partition), thereby providing network redundancy for each partition of switches.

For example, end host EH1 of FIG. 6 is coupled to the first (shaded) partition via port $P_1$ on edge switch E1 and is coupled to the second (unshaded) partition via port $P_2$ on edge switch E2, end host EH2 is coupled to the first partition via port $P_2$ on switch E1 and is coupled to the second partition via port $P_3$ on switch E2, end host EH4 is coupled to the first partition via port $P_2$ on switch E3 and is coupled to the second partition via port $P_2$ on switch E4, etc. If desired, controllers 18 may identify these redundant partitions of switches based on the gathered topology of network 100 and may use the identified partitions for performing uninterrupted software upgrade operations on the network. In other words, controllers 18 may partition (group) the switches in a manner such that each end host is able to communicate with every other end host in network 100 through each of the partitions.

For example, end host EH1 may communicate with end host EH2 either through the first partition (e.g., edge switch E1 may forward a packet received from end host EH1 via port $P_1$ to end host EH2 via port $P_2$) or through the second partition (e.g., edge switch E2 may forward a packet received from end host EH1 via port $P_2$ to end host EH2 via port $P_3$). This example is merely illustrative. If desired, controllers 18 may partition the switches in network 100 into any number of redundant sets (partitions) based on the connections between end hosts EH and switches 14 in the network (e.g., controllers 18 may group the switches into three partitions in scenarios where each end host is connected to at least three edge switches, may group the switches into four partitions in scenarios where each end host is connected to at least four edge switches, etc.).

At step 202, first controller 18A may perform upgrade operations on itself by installing new (updated) software. For example, first controller 18A may obtain new software from an external source, may install the new software, and may reboot to implement the new software. While first controller 18A is installing the new software and rebooting, controller 18A may be in a standby (idle) mode in which controller 18A does not control switches 14 in network 100 (e.g., TCP connections with the switches may be disconnected or dropped). Controller 18B may be active and may control data forwarding through network 100 while controller 18A is idle, thereby preventing noticeable reduction in data forwarding performance in network 100.

At step 204, second controller 18B may transfer control of the first redundant partition of switches (e.g., switches E1, C1, and E3 of FIG. 6) to upgraded first controller 18A (e.g., the first controller 18A after controller 18A installs and implements the updated software). Upgraded first controller 18A may instruct the switches in the first partition to install the new software. For example, upgraded controller 18A may instruct switches E1, C1, and E3 in the first partition to install the updated software and to reboot.

Controller 18B may be active and may manage (e.g., control) data forwarding using the second partition of switches while the first partition of switches installs the new software. Switches in the second partition may forward data between each end host EH while the first partition of switches installs the new software. If desired, after the first partition of switches has been upgraded (e.g., after the first partition has installed the new software and rebooted), there may be a period of time during which both the first and second controllers are actively controlling switches in network 100 (e.g., during which the upgraded first controller 18A controls network forwarding using the upgraded first partition of switches and during which the second controller 18B controls forwarding using the second partition of switches).

At step 206, second controller 18B may transfer control of the second redundant partition of switches (e.g., switches E2, C2, and E4) to upgraded first controller 18A. Upgraded first controller 18A may instruct the switches in the second partition to install the new software. For example, upgraded controller 18A may instruct switches E2, C2, and E4 in the second partition to install the updated software and to reboot.

At step 208, second controller 18B may perform upgrade operations on itself by installing new software. For example, second controller 18B may obtain new software from an external source, may install the new software, and may reboot to implement the new software. While second controller 18B is installing the new software and rebooting, controller 18B may be in a standby (idle) mode in which controller 18B does not control switches 14 in network 100. Controller 18A may be active and may manage data forwarding through network 100 while controller 18B is idle, thereby preventing noticeable reduction in data forwarding performance through network 100. If desired, second controller 18B may install the new software and reboot prior to installing the new software on the second partition of switches, after installing the new software on the second partition of switches, or concurrently with installation of the new software on the second partition of switches.

By partitioning the network into redundant groups and performing installation and rebooting operations on one redundant group and one controller at a time, there may be path through the network for forwarding data between a given end host EH and all other end hosts EH in network 100 (e.g., even while some of the network switches are rebooting) without a noticeable impact on the performance of the network during the upgrade process (e.g., the upgrade process of FIG. 8 may sometimes be referred to as a "seamless," "hit-less," or "uninterrupted" upgrade process because communications between end hosts is not interrupted during the software upgrade process).

For example, data may be forwarded between any of the end hosts EH even when the switches in one of the partitions are disabled (e.g., while those switches are rebooting with the new software) or when one of the controllers is disabled (e.g., while that controller is rebooting with the new software). In the example of FIG. 6, network 100 may route packets sent by end host EH1 to end host EH2 by forwarding the packets through switch E2 in the second partition even when switches E1, C1, and E3 of the first partition are rebooting and may route the packets sent by end host EH1 to end host EH2 by forwarding the packets through switch E1 in the first partition even when switches E2, C2, and E4 in the second partition are rebooting.

FIGS. 9A-9D show a flow chart of illustrative steps that may be performed by first and second switch controllers to perform uninterrupted software upgrade operations on the switches in a communications network. The steps of FIGS. 9A-9D are described in connection with the example of FIG. 6 in which first and second controllers 18A and 18B perform upgrade operations on switches 14 in network 100. This is merely illustrative and does not serve to limit the scope of the present invention. If desired, the steps of FIGS. 9A-9D may be performed using any desired communications network having any desired number and arrangement of controllers, switches, and end hosts.

Figure 9A:
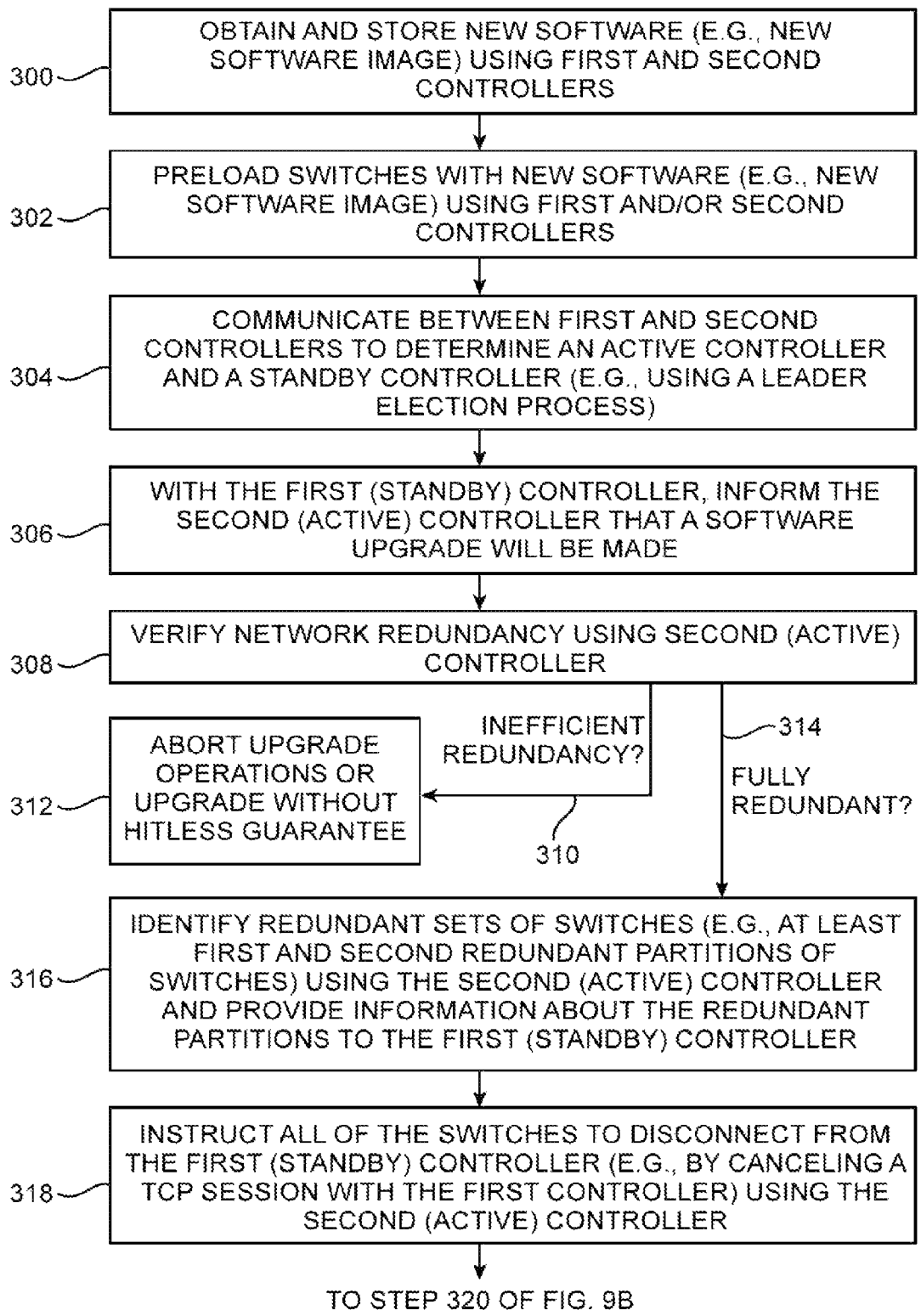
FIGS. 9A-9D is a flow chart of illustrative steps that may be performed by first and second controllers for partitioning a network having redundant connections and performing software upgrade operations on the network without data forwarding interruptions in accordance with an embodiment of the present invention.

At step 300 of FIG. 9A, first controllers 18A and second controller 18B may obtain new (updated) software. For example, a user of network 100 may provide the new software to controllers 18A and 18B and/or controllers 18A and 18B may receive the new software over other networks such as network 102 (e.g., the internet) as shown in FIG. 6. Controllers 18A and 18B may store (cache) the new software on memory until the new software is to be installed. If desired, controllers 18A and 18B may store multiple uninstalled versions of software (e.g., multiple uninstalled software images, different software versions or builds, etc.) on memory for installation at a later time (e.g., so that a user of network 100 may select a pre-loaded software image to install from memory when desired).

At step 302, one or both of controllers 18A and 18B may pre-load the new software onto switches 14 (e.g., leaf switches and spine switches in network 100). For example, controllers 18A and 18B may provide the new software to switches 14 over control paths 66. Switches 14 may store (cache) the new software on memory until the new software is to be installed. If desired, switches 14 may store multiple uninstalled versions of the software on memory for installation at a later time.

At step 304, first controller 18A may communicate with second controller 18B (e.g., by conveying control messages over inter-controller path 67) to determine an initial active controller and standby controller. If desired, controllers 18A and 18B may determine the active and standby controllers using a leader election process. In the scenario described herein as an example, controller 18B may be identified as the active controller and controller 18A may be identified as the standby controller prior to installing the new software. This is merely illustrative and, in general, any controller 18 in network 100 may be elected the active or standby controller.

At step 306, first (standby) controller 18A may inform second (active) controller 18B that a software upgrade is to be made (e.g., by providing control messages over inter-controller path 67). If desired, first controller 18A may inform second controller 18B that an upgrade is to be made in response to receiving input from a user of network 100 (e.g., a system administrator for network 100, etc.), after a predetermined time period or at regular predetermined intervals, once new software is obtained, etc.

At step 308, second (active) controller 18B may verify connection redundancy in network 100 (e.g., controller 18B may process network topology information to determine whether the network has sufficient connection redundancy to perform an interrupted software upgrade). If desired, second controller 18B may lock the configuration of network 100 (e.g., to ensure that any verified network redundancy does not change and to ensure that there are no new changes to the configuration of network 100 until after the new software is installed).

If second (active) controller 18B determines that there is insufficient connection redundancy in network 100, processing may proceed to step 312 as shown by path 310. Second controller 18B may, for example, determine that there is insufficient redundancy in network 100 if each end host EH is not connected to at least two edge switches (e.g., if there are end hosts that are connected to only one edge switch and/or if there are not at least two redundant network paths between each pair of end hosts EH in network 100).

At step 312, controllers 18 may abort the upgrade operations and continue performing normal data forwarding or may perform software upgrade operations on network 100 that generate a noticeable reduction in network forwarding performance (e.g., an upgrade operation having a performance "hit"). For example, controllers 18 may update software on switches 14 without a guarantee that there is always a redundant data path for forwarding packets between any given pair of end hosts EH in this scenario.

If second (active) controller 18B determines that network 100 has sufficient redundancy (e.g., that network 100 is fully redundant), processing may proceed to step 316 as shown by path 314. Second controller 18B may, for example, determine that network 100 is fully redundant if each end host EH in the network is coupled to at least two edge switches 14 (e.g., if there are at least two redundant network paths between each pair of end hosts in network 100). In the example of FIG. 6, second controller 18B determines that network 100 is fully redundant because each end host EH is connected to at least two edge switches and there are two redundant network paths between each end host EH. In another suitable arrangement, controller 18B may identify portions of network 100 (e.g., subsets of switches) that are redundant and may only perform software upgrade operations on the portions of network 100 that are redundant.

At step 316, second (active) controller 18B may identify the redundant sets of switches in network 100. If desired, second controller 18B may provide information about the redundant sets of switches to first (standby) controller 18A. In the example of FIG. 6, second controller 18B may identify first and second redundant partitions of switches (e.g., a first redundant partition including switches E1, E3, and C1 and a second redundant partition including switches E2, C2, and E4), because packets may be forwarded between any pair of end hosts EH in network 100 through the first partition (e.g., switches E1, C1, and E3) without traversing any switches in the second partition (e.g., switches E2, C2, and E4) and packets may be forwarded between any pair of end hosts EH through the second partition without traversing any switches in the first partition.

At step 318, second (active) controller 18B may instruct all of the switches 14 in network 100 to disconnect from first (standby) controller 18A (e.g., may instruct switches 14 to disable connections with first controller 18A). For example, second (active) controller 18B may instruct switches 14 to cancel or drop a TCP session between switches 14 and first (standby) controller 18A. Steps 300-318 as shown in FIG. 9A may, for example, be performed by controllers 18 while processing step 200 of FIG. 8. Processing may subsequently proceed to step 320 as shown in FIG. 9B.

At step 320, first (standby) controller 18A may perform upgrade operations on itself by installing the new software (e.g., the software image that was pre-loaded onto first controller 18A while processing step 300 of FIG. 9A). After the new software is installed, controller 18A may reboot (e.g., controller 18A may boot with the new installed software, obtain an IP address, etc.). Step 320 may, for example, be performed while processing step 202 of FIG. 8. Steps 322-328 of FIG. 9B and steps 330-340 of FIG. 9C may, for example, be performed while processing step 204 of FIG. 8.

Figure 9B:
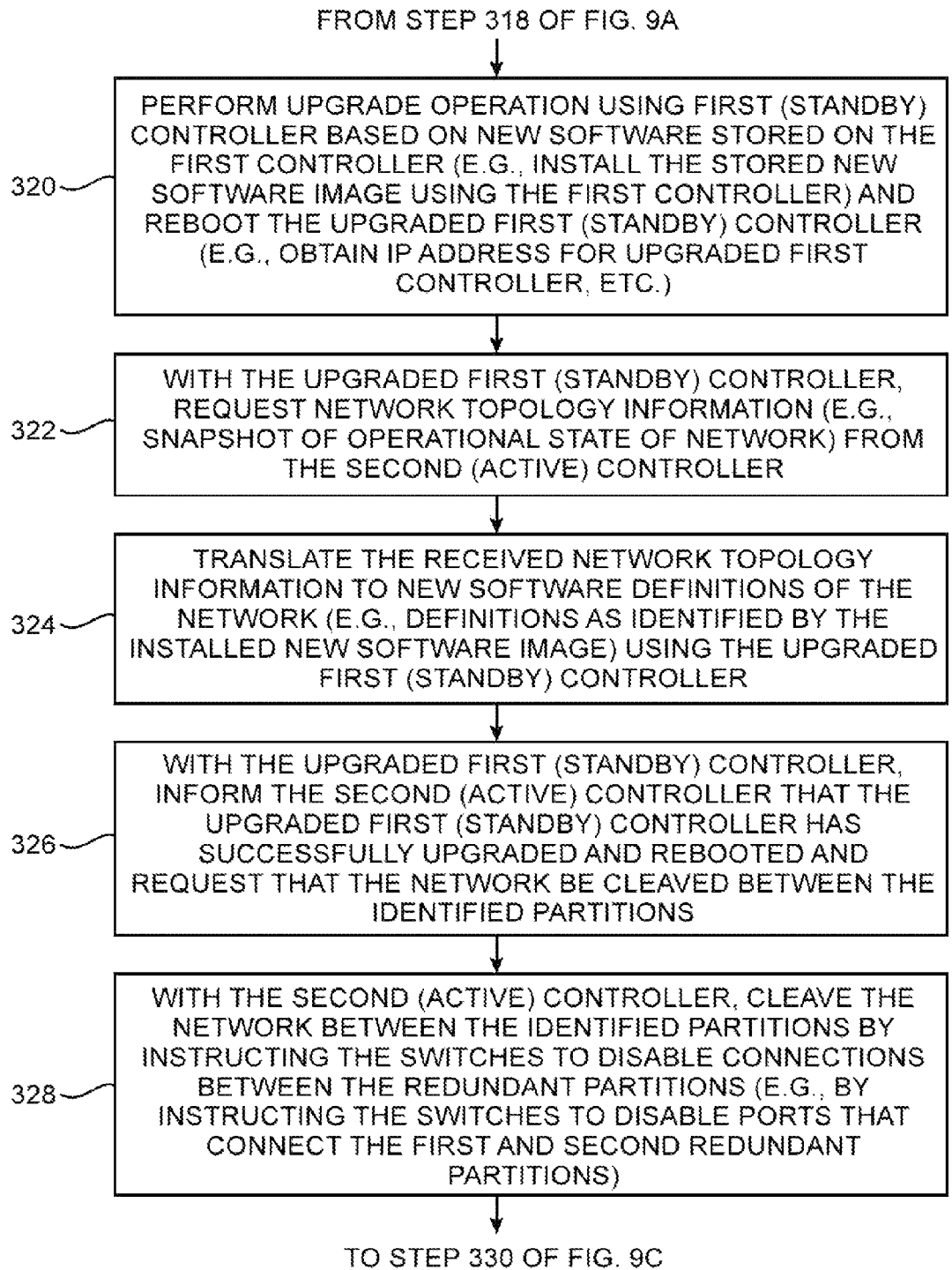

At step 322 as shown in FIG. 9B, the upgraded first (standby) controller 18A may request network topology information from second (active) controller 18B). Second (active) controller 18B may provide network topology information (e.g., a snapshot of the operational state of network 100) to upgraded first (standby) controller 18A (e.g., via inter-controller path 67).

At step 324, the upgraded first (standby) controller 18A may translate (convert) the received network topology information to new software definitions of the network (e.g., new software network definitions as identified by the installed new software image at controller 18A). If desired, the new software definitions (e.g., new software scheme for representing the network) may be strictly additive (e.g., to add lines to the previous software definitions of the network without deleting or removing existing lines) or may include transition functions that map between the previous and new software definitions of the network. In general, other changes to the software definitions of the network (e.g., non-additive changes) can often require excessive resources and time for controllers 18 to process and may thereby render the upgrade operation noticeable to a user of the network (e.g., "hit-full"). If desired, first controller 18A may use the network topology information that has been translated to the new (updated) software network definitions for generating flow table entries for switches 14 (e.g., based on network policies implemented on controllers 81).

At step 326, upgraded first (standby) controller 18A may inform second (active) controller 18B that first controller 18A has successfully installed the updated software. First controller 18A may request that second controller 18B logically cleave network 100 between the identified first and second partitions.

At step 328, second (active) controller 18B may logically cleave the network 100 between the identified first and second partitions (e.g., in response to receiving the request to cleave the network from first controller 18A). Controller 18B may cleave the network by instructing switches 14 to disable connections between the first and second partitions (e.g., by instructing switches 14 to disable ports that are connected to switches in other redundant partitions). For example, controller 18B may instruct switch E2 (as shown in FIG. 6) in the second partition to disable port $P_1$ connected to switch E1 in the first partition, may instruct switch E2 to disable port $P_4$ connected to switch E3 in the first partition, may instruct switch E3 in the first partition to disable port $P_1$ connected to switch E2 in the second partition, may instruct switch E3 to disable port $P_4$ connected to switch E4 in the first partition, etc. In this way, network paths between the redundant partitions such as network paths 65 may be disabled for performing subsequent upgrade operations.

Figure 9C:
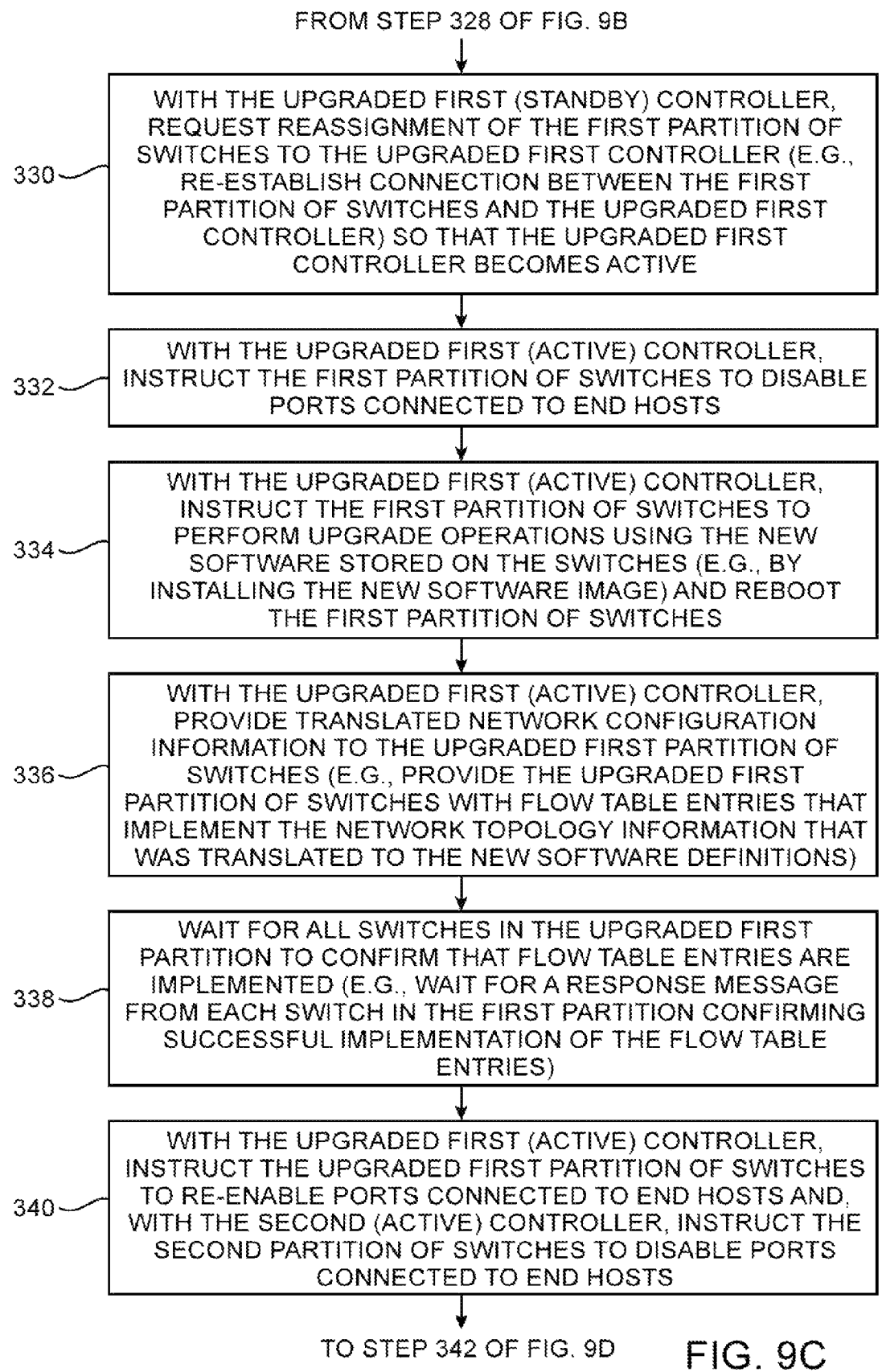

Processing may proceed to step 330 as shown in FIG. 9C. At step 330, upgraded first (standby) controller 18A may request reassignment of the first partition of switches from second (active) controller 18B. Second (active) controller 18B may transfer control of the first partition of switches to upgraded first controller 18A. For example, second (active) controller 18B may instruct the first partition of switches to re-establish connections with first controller 18A (e.g., to re-establish respective TCP sessions with first controller 18A). If desired, second controller 18B may subsequently disconnect from the switches in the first partition. First controller 18A may enter an active mode from the standby mode (e.g., first controller 18A may become an active controller) after the first partition of switches has been reassigned to upgraded first controller 18A (e.g., first controller 18A may actively control the first partition of switches). In this scenario, both the first and second controllers 18 may be active (e.g., the first controller may control the first partition of switches whereas the second controller may control the second partition of switches) after reassignment of the first partition to upgraded first controller 18A. If desired, the duration in which both controllers 18 are active may be limited so that the duration is less than a predetermined value associated with an application timeout period of end hosts EH (e.g., less than approximately 3-5 seconds).

At step 332, upgraded first (active) controller 18A may instruct the first partition of switches to disconnect from end hosts EH. For example, controller 18A may instruct the first partition of switches to disable ports connected to end hosts EH. In the example of FIG. 6, upgraded first (active) controller 18A may instruct switch E1 to disable ports P$_1$ and P$_2$ connected to end hosts EH1 and EH2 and may instruct switch E3 to disable ports P$_2$ and P$_3$ connected to end hosts EH3 and EH4. End hosts EH may continue to send and receive data packets over the second partition of switches even when the first partition of switches is disconnected from the end hosts.

At step 334, upgraded first (active) controller 18A may instruct the first partition of switches to install the new software stored on the first partition of switches (e.g., the software images pre-loaded onto the switches while processing step 302 of FIG. 9A). After installing the new software, the switches in the first partition may reboot to complete the software installation process.

If desired, upgraded first controller 18A may optionally determine whether switches in the first partition need to be upgraded (e.g., controller 18A may identify whether any switches in the first partition have already installed the latest version of the software) and may instruct switches that still need to install the new software to install the new software and reboot. In this scenario, upgraded first controller 18A may only instruct switches in the first partition that need to upgrade to the new software to disable ports connected to end hosts EH. For example, end host ports on switches in the first partition that have already installed the latest software version and that do not need to be upgraded may remain enabled while the other switches in the first partition are upgraded, and the switches that have already been upgraded may continue to be used to forward data for end hosts EH.

At step 336, upgraded first (active) controller 18A may provide network configuration information that has been translated to the updated software definitions (e.g., translated while processing step 324 of FIG. 9B) to the switches in the upgraded first partition. For example, upgraded first (active) controller 18A may generate packet forwarding rules such as flow table entries that implement a desired network configuration (e.g., that implement desired network policies or rules) using updated software definitions provided by the new software. Controller 18A may provide the generated flow table entries to the upgraded switches in the first partition. The upgraded switches in the first partition may process and implement the received flow table entries for performing packet forwarding operations (e.g., because the upgraded switches have installed the new software and are thereby capable of handling flow table entries that were generated using any new software definitions).

At step 338, upgraded first (active) controller 18A may wait for all switches in the upgraded first partition to confirm that the flow table entries (e.g., the flow table entries generated based on the new software definitions) have been successfully implemented. For example, first controller 18A may wait until a response message is received from each upgraded switch in the first partition that indicates that the flow table entries have been successfully implemented on the upgraded switches.

Figure 9D:
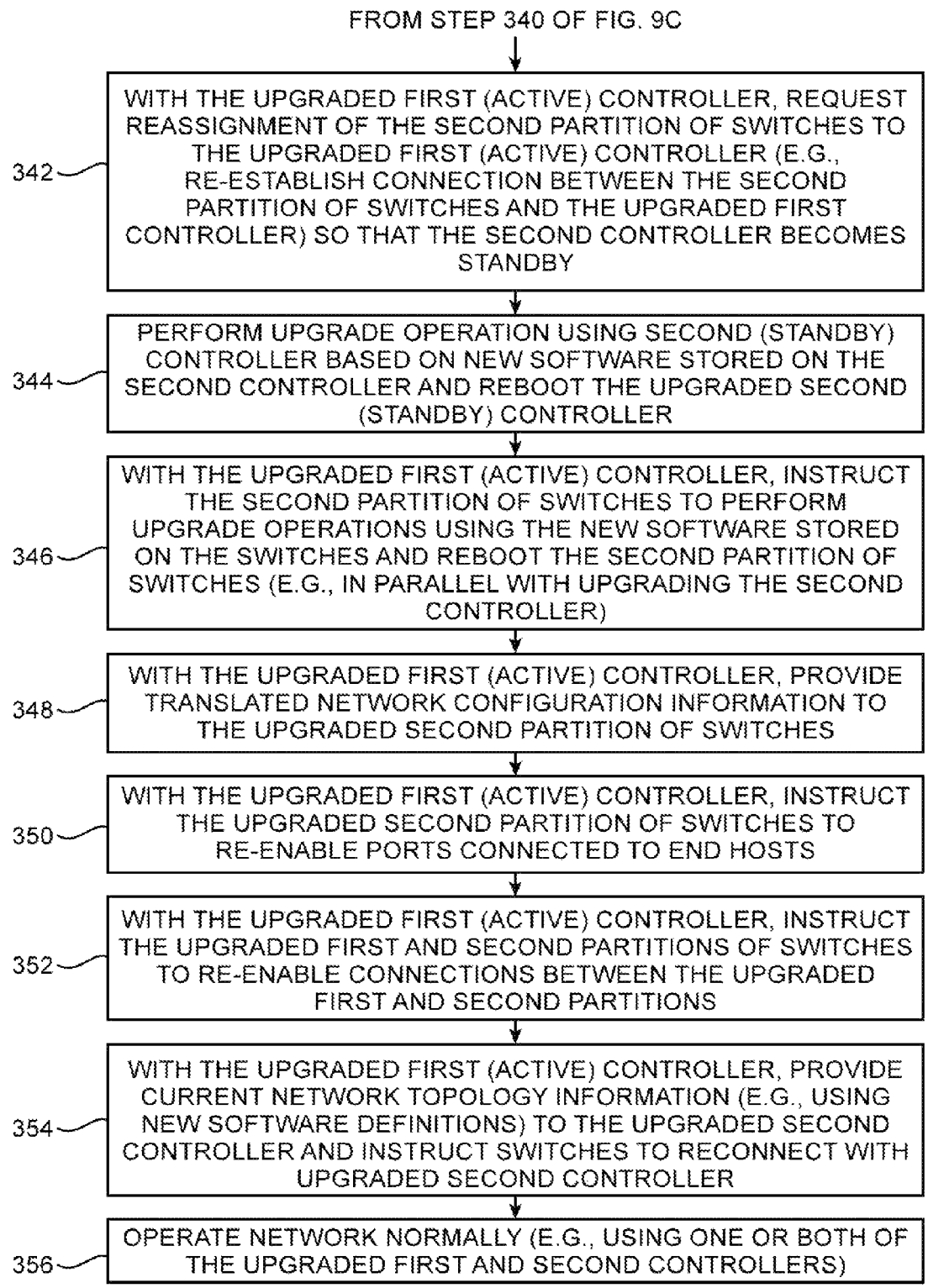

At step 340, upgraded first (active) controller 18A may instruct the upgraded first partition of switches to re-enable ports connected to end hosts EH. For example, upgraded first (active) controller 18A may instruct switch E1 to enable ports P$_1$ and P$_2$ and may instruct switch E3 to re-enable ports P$_2$ and P$_3$. Second (active) controller 18B may instruct the second partition of switches to disconnect from end hosts EH. For example, second controller 18B may instruct the second partition of switches to disable ports connected to end hosts EH (e.g., second (active) controller 18B may instruct switch E2 to disable ports P$_2$ and P$_3$ connected to end hosts EH1 and EH2 and may instruct switch E4 to disable ports P$_2$ and P$_3$ connected to end hosts EH3 and EH4). End hosts EH may continue to send and receive data packets over the first partition of switches even when the second partition of switches is disconnected from the end hosts (e.g., allowing for uninterrupted data forwarding between end hosts without a noticeable performance reduction). Processing may proceed to step 342 as shown by FIG. 9D. Steps 342-354 may, for example, be performed while processing steps 206 and 208 of FIG. 8.

At step 342 as shown in FIG. 9D, upgraded first (active) controller 18A may request reassignment of the second partition of switches from second controller 18B. Second controller 18B may transfer control of the second partition of switches to upgraded first (active) controller 18A. For example, second controller 18B may instruct the second partition of switches to re-enable connections with upgraded first controller 18A (e.g., to re-establish respective TCP sessions with first controller 18A). If desired, second controller 18B may disconnect from the switches in the second partition. Second controller 18B may enter a standby mode (e.g., an idle or inactive mode) after the second partition of switches has been reassigned to upgraded first (active) controller 18A.

At step 344, second (standby) controller 18B may perform upgrade operations on itself by installing the new software (e.g., the software image that was pre-loaded onto second controller 18B while processing step 300 of FIG. 9A). After the new software is installed, second controller 18B may reboot (e.g., controller 18B may boot with the new installed software, obtain an IP address, etc.).

At step 346, upgraded first (active) controller 18A may instruct the second partition of switches to install the new software stored on the second partition of switches (e.g., the software images pre-loaded onto the switches while processing step 302 of FIG. 9A). After installing the new software, the switches in the second partition may reboot to complete the software installation process.

If desired, upgraded first controller 18A may optionally determine whether switches in the second partition need to be upgraded (e.g., controller 18A may determine whether any switches in the second partition have already installed the latest version of the software) and may instruct switches that still need to install the new software to install the new software and reboot. In this scenario, upgraded first controller 18A may only instruct switches in the second partition that need to upgrade to the new software to disable ports connected to end hosts EH. For example, end host ports on switches in the second partition that have already installed the latest software version and that do not need to be upgraded may remain enabled while the other switches in the second partition are upgraded, and the switches that have already been upgraded may continue to be used to forward data for end hosts EH.

If desired, upgraded first (active) controller 18A may instruct the second partition of switches to install the pre-loaded new software and reboot prior to installing the new software on second controller 18B, after installing the new software on second controller 18B, or concurrently with (e.g., simultaneously with or in parallel with) installing the new software on second controller 18B (e.g., step 346 may be performed prior to, after, or concurrently with step 344). By performing steps 344 and 346 in parallel, controllers 18 may reduce the time required to upgrade network 100 relative to performing steps 344 and 346 serially, for example.

At step 348, upgraded first (active) controller 18A may provide network configuration information that has been translated to the updated software definitions (e.g., translated while processing step 324 of FIG. 9B) to the switches in the upgraded second partition. For example, upgraded first (active) controller 18A may generate network forwarding rules such as flow table entries that implement a desired network configuration (e.g., that implement desired network policies or rules) using updated software definitions provided by the new software. Controller 18A may provide the generated flow table entries to the upgraded switches in the second partition. The upgraded switches in the second partition may process and implement the received flow table entries for performing packet forwarding operations.

At step 350, upgraded first (active) controller 18A may instruct the upgraded second partition of switches to re-enable ports connected to end hosts EH. For example, upgraded first (active) controller 18A may instruct switch E2 to enable ports $P_2$ and $P_3$ and may instruct switch E4 to re-enable ports $P_2$ and $P_3$. The upgraded switches in the first and second partitions may subsequently be used for forwarding data through network 100.

At step 352, upgraded first (active) controller 18A may instruct the upgraded first and second partitions of switches to re-enable connections between the first and second partitions. For example, upgraded first (active) controller 18A may instruct switch E2 in the second partition to enable port $P_1$ connected to switch E1 in the first partition, may instruct switch E2 to enable port $P_4$ connected to switch E3 in the first partition, may instruct switch E3 in the first partition to enable port $P_1$ connected to switch E2 in the second partition, may instruct switch E3 to enable port $P_4$ connected to switch E4 in the first partition, etc. In this way, network paths between the redundant partitions such as network paths 65 may be re-established for performing subsequent forwarding operations.

At step 354, upgraded first (active) controller 18A may provide current network topology information associated with network 100 to upgraded second (standby) controller 18B. The current network topology information may be represented using the new software definitions provided by the new installed software. Upgraded first (active) controller 18A may instruct the switches in network 100 (e.g., the first and second partitions) to re-establish connections with upgraded second controller 18B. If desired, upgraded second controller 18B may enter an active mode from the standby mode (e.g., second controller 18B may become an active controller) after the switches have reconnected to second controller 18B. Upgraded second (active) controller 18B may use the current topology information received from upgraded first (active) controller 18A to generate flow table entries for the switches, for example.

At step 356, switches 14 may be connected to both controllers 18A and 18B and network 100 may resume normal data forwarding operations with updated (new) software implemented on controllers 18 and switches 14. If desired, upgraded first controller 18A may be used to control packet forwarding through network 100 (e.g., by providing flow table entries to the upgraded switches on the network), second controller 18B may be used to control packet forwarding through the network, or both of controllers 18A and 18B may be used to control packet forwarding through the network. The example of FIG. 9D is merely illustrative. In general, steps 350-354 may be performed in any desired order or in parallel (e.g., step 352 may be performed prior to step 350, step 354 may be performed prior to step 352, step 350 may be performed in parallel with step 352, etc.).

By performing software upgrade operations on one controller at a time and one redundant partition of switches at a time in this manner, packets may be forwarded through network 100 during the software upgrade operations and any increase in the time period required for a packet to traverse the network during the update operation may be limited to less than timeout periods associated with applications running on end hosts EH (less than 3 seconds, for example).

The example of FIGS. 9A-9D in which the switches in network 100 are upgraded in two phases (e.g., a first phase in which the first partition of switches is upgraded and a second phase in which the second partition of switches is upgraded) is merely illustrative. If desired, any number of phases may be used to upgrade the switches in network 100. If desired, the switches in network 100 may be partitioned into any desired number of redundant groups that are each upgraded during respective phases.

Figure 10:
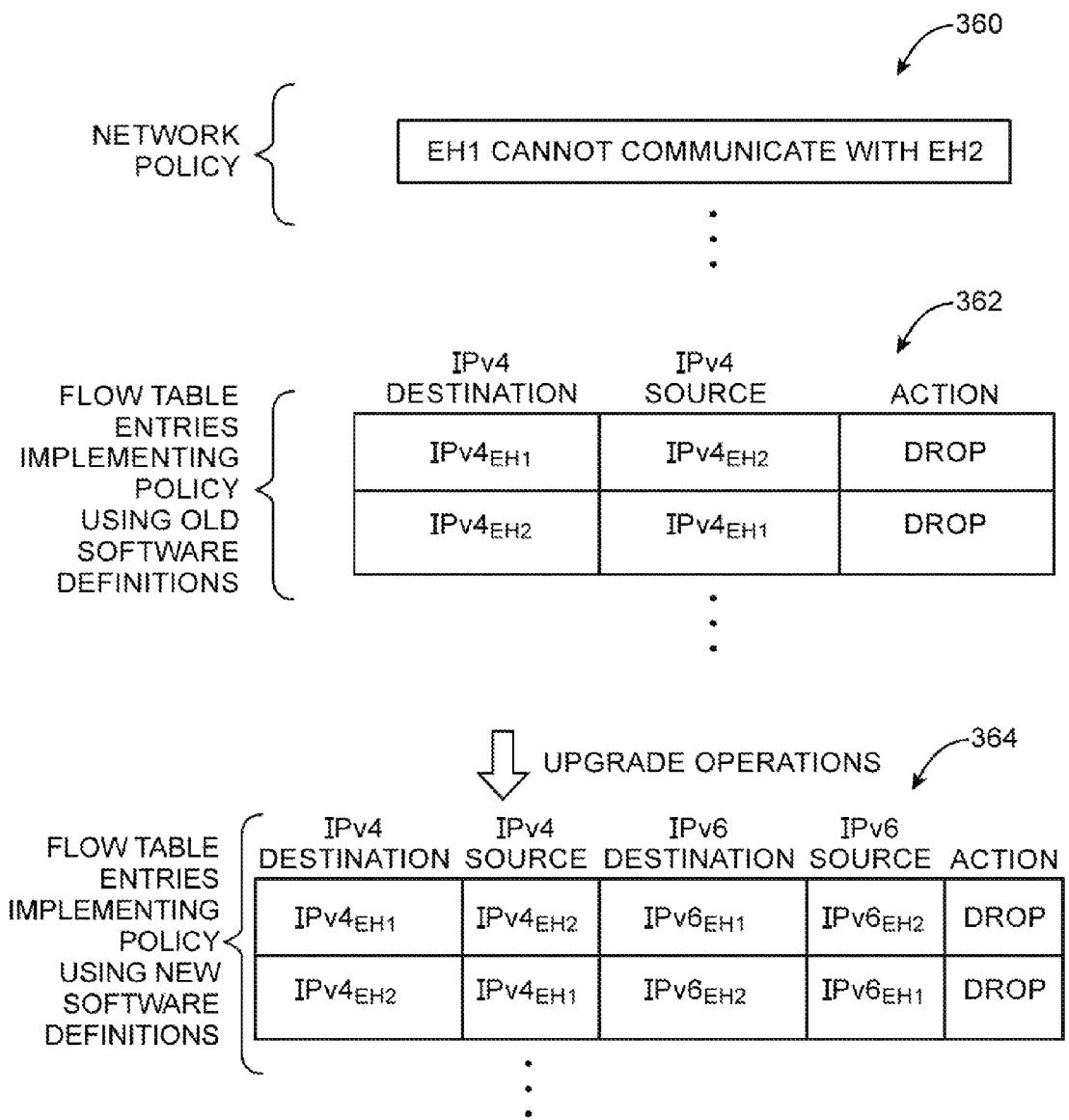
FIG. 10 is a diagram of illustrative flow table entries that may be generated using a network policy before and after upgrading software on the network in accordance with an embodiment of the present invention.

FIG. 10 is an illustrative diagram showing how first controller 18A may generate flow table entries for upgraded switches in network 100 based on stored network topology information and network policy information before and after installing the updated software.

As shown in FIG. 10, a network policy such as network policy 360 may be stored on first controller 18A. The network policy may, for example, be provided by a user of network 100 (e.g., a network administrator) and stored as a portion of network configuration rules 20 (see, e.g., FIG. 1). In the example of FIG. 10, policy 360 specifies that end host EH1 as shown in FIG. 6 cannot communicate with end host EH2 (e.g., the network administrator may desire that communication between end hosts EH1 and EH2 be restricted). Controller 18A may generate flow table entries 362 that implement policy 360 to restrict communications between end hosts EH1 and EH2 (e.g., using information about the topology of network 100 and software definitions provided by software running on controller 18A such as control software 54 as shown in FIG. 2).

The first entry (row) of flow table entries 362 directs a switch in which the flow table entry is operating to drop packets having the Internet Protocol Version 4 (IPv4) destination address of end host EH1 (e.g., having a header field with the IPv4 destination address value of $IPv4_{EH1}$) and the IPv4 source address of end host EH2 (e.g., having a header field with the IPv4 source address value $IPv4_{EH2}$). The second row of flow table entries 362 directs a switch in which the flow table entry is operating to drop packets having the IPv4 destination address value $IPv4_{EH2}$ and the IPv4 source address value $IPv4_{EH1}$. In this way, when a switch in network 100 having flow table entries 362 receives a packet that matches entries 362, that packet will be dropped. For example, packets may be generated by end host EH1 with a source address value $IPv4_{EH1}$ and a destination address value $IPv4_{EH2}$. When the generated packet is received at switch E1 or E2 implementing flow table entries 362, that switch will drop the received packet, thereby preventing data communication between end hosts EH1 and EH2 and implementing network policy 360 restricting communication between end hosts EH1 and EH2.

Network 100 may be upgraded using new software (e.g., using the steps of FIGS. 8 and 9A-9D). In the example of FIG. 10, the new software may configure controllers 18 and switches 14 in network 100 to handle Internet Protocol Version 6 (IPv6) traffic (whereas switches 14 and controllers 18 handled IPv4 traffic without handling IPv6 traffic prior to the software upgrade). After installing the new update, controller 18A may generate flow table entries 364 that implement policy 360 to restrict communications between end hosts EH1 and EH2 using information about the topology of network 100 and software definitions provided by the new software installed on controller 18A during the upgrade process.

The first entry (row) of flow table entries 364 directs a switch in which the flow table entry is operating to drop packets having the Internet Protocol Version 6 (IPv6) destination address of end host EH1 (e.g., having header fields with the IPv6 destination address value of $IPv6_{EH1}$) and the IPv6 source address of end host EH2 (e.g., having header fields with the IPv6 source address value $IPv6_{EH2}$). The second row of flow table entries 362 directs a switch in which the flow table entry is operating to drop packets having headers with the IPv6 destination address value $IPv6_{EH2}$ and the IPv6 source address value $IPv6_{EH1}$. In this way, when a switch in network 100 having flow table entries 364 receives a packet that matches entries 364, that packet will be dropped. For example, packets may be generated by end host EH1 with a source address value $IPv6_{EH1}$ and a destination address value $IPv6_{EH2}$. When the generated packet is received at switch E1 or E2 implementing flow table entries 364, that switch will drop the received packet, thereby preventing data communication between end hosts EH1 and EH2.

In the example of FIG. 10, an additive software upgrade is performed on network 100 in which the new software definitions add IPv6 source and destination header fields to the flow tables generated by controller 18 without removing other header fields generated using the previous software definitions (e.g., the IPv4 fields). In this way, switches 14 may be upgraded to handle IPv6 traffic without losing forwarding functionality for IPv4 packets as specified by the previous software definitions. In general, the software upgrades performed by network 100 may be additive or map previous software definitions to updated software definitions without removing or deleting any previous software definitions in order to ensure an uninterrupted (e.g., "hit-less") upgrade process. The example of FIG. 10 is merely illustrative. If desired, the software upgrade operations may update any desired software definitions implemented by controllers 18 and switches 14.

The foregoing is merely illustrative of the principles of this invention and various modifications can be made by those skilled in the art without departing from the scope and spirit of the invention.

What is claimed is:

1. A method of using at least first and second controllers that each controls switches in a network having end hosts that are coupled to the switches, the method comprising:
   with the first controller, communicating with the second controller to perform a software upgrade operation on the network, wherein the switches in the network forward network traffic between the end hosts during the software upgrade operation, and wherein the first and second controllers are separate from the switches;
   with the second controller, identifying first and second redundant partitions of switches in the network, wherein each of the end hosts is coupled to the first redundant partition of switches and each of the end hosts is coupled to the second redundant partitions of switches;
   with a given one of the first and second controllers, loading software onto the first and second redundant partitions of switches and onto the first and second controllers;
   with the second controller, instructing each of the switches in the first and second redundant partitions of switches to disable a respective connection with the first controller;
   with the second controller, after each of the switches in the first and second redundant partitions have disabled the respective connections with the first controller, providing flow table entries to the switches in the first and second redundant partitions of switches without conveying the flow table entries through the first controller, wherein the first and second redundant partitions of switches each include at least two switches and wherein the second redundant partition of switches does not include any switches from the first redundant partition of switches;
   with the second controller, determining whether there exists network redundancy in the network;
   with the second controller, aborting the software upgrade operation in response to determining that the network redundancy does not exist in the network; and
   with the second controller, identifying the switches in the first and second redundant partitions of switches in response to determining that the network redundancy exists in the network
   with the first controller, installing the loaded software on the first controller;
   with the first controller, instructing each of the switches in the first redundant partition of switches to install the loaded software after the first controller has finished installing the loaded software;
   with the second controller, installing the loaded software after the first redundant partition of switches has finished installing the loaded software; and
   with the first controller and concurrently with installing the loaded software at the second controller, instructing each of the switches in the second redundant partition of switches to install the loaded software.

2. The method defined in claim 1 further comprising:
   with the first controller, performing a leader election process to elect a selected one of the first and second controllers as an active controller by communicating with the second controller.

3. The method defined in claim 1, further comprising:
   with the second controller, instructing the first redundant partition of switches to enable the disabled connections between the first redundant partition of switches and the first controller;
   with the first controller, instructing the first redundant partition of switches to install the loaded software after the disabled connections between the first redundant partition of switches and the first controller have been enabled; and
   with the second redundant partition of switches, forwarding the network traffic between the end hosts while the first redundant partition of switches installs the loaded software.

4. The method defined in claim 3, further comprising:
   with the second controller, instructing the second redundant partition of switches to enable the disabled connections between the first partition of switches and the first controller;
   with the first controller, instructing the second redundant partition of switches to install the loaded software after the disabled connections between the second redundant partition of switches and the first controller have been enabled; and with the first redundant partition of switches, forwarding the network traffic between the end hosts while the second redundant partition of switches installs the loaded software.

5. The method defined in claim 1, further comprising:
with the first controller, installing the loaded software on the first controller after each of the switches in the first and second redundant partitions of switches have disabled the respective connections with the first controller.

6. The method defined in claim 5, further comprising:
with the second controller, instructing the first redundant partition of switches to enable the disabled connections between the first redundant partition of switches and the first controller; and
with the first controller, instructing the first redundant partition of switches to install the loaded software after the disabled connections between the first redundant partition of switches and the first controller have been enabled.

7. The method defined in claim 6, further comprising:
with the second controller, instructing the second redundant partition of switches to enable the disabled connections between the second redundant partition of switches and the first controller; and
with the first controller, instructing the second redundant partition of switches to install the loaded software after the disabled connections between the second redundant partition of switches and the first controller have been enabled.

8. The method defined in claim 7, further comprising:
with the second controller, installing the loaded software on the second controller while the second redundant partition of switches installs the loaded software.

9. The method defined in claim 1, further comprising:
with the first controller, receiving network topology information identifying connections in the network from the second controller;
with the first controller, installing a software image that specifies updated software definitions for the network; and
with the first controller, translating the received network topology information to the updated software definitions specified by the installed software image.

10. The method defined in claim 9, further comprising:
with the first controller, generating additional flow table entries based on the translated network topology information; and
with the first controller, providing the additional flow table entries to the switches.

11. The method defined in claim 10, wherein the switches in the network forward network traffic between the end hosts over network paths and the first controller provides the additional flow table entries to the switches over control paths.

12. The method defined in claim 1, further comprising:
with the second controller, instructing each of the switches in the first and second redundant partitions of switches to disable all ports between the first and second redundant partitions of switches before the second controller begins installing the loaded software;
with the second controller, instructing each of the switches in the first and second redundant partitions of switches to disable all connections with the first controller before the first controller begins installing the loaded software;
with the first controller, re-enabling connections between the first controller and each of the switches in the first redundant partition of switches after the first controller has finished installing the loaded software;
with the first controller, instructing the first redundant partition of switches to disable connections with all of the end hosts after the connections between the first controller and each of the switches in the first redundant partition of switches has been enabled, wherein the first controller instructs each of the switches in the first redundant partition of switches to install the loaded software after each of the switches in the first redundant partition of switches has disabled the connections with all of the end hosts;
with the first controller, instructing the first redundant partition of switches to re-enable the connections with all of the end hosts after the first redundant partition of switches has finished installing the loaded software;
with the second controller, instructing the second redundant partition of switches to disable connections with all of the end hosts after the first redundant partition of switches has re-enabled the connections with all of the end hosts;
with the first controller, re-enabling connections between the first controller and each of the switches in the second redundant partition of switches after first redundant partition of switches has finished installing the loaded software;
with the first controller, instructing each of the switches in the second redundant partition of switches to install the loaded software after the connections between the first controller and each of the switches in the second redundant partition of switches have been re-enabled and after the connections between the second redundant partition of switches and all of the end hosts have been disabled;
with the first controller, instructing the second redundant partition of switches to re-enable the connections between the second partition of switches and all of the end hosts after the second redundant partition of switches has finished installing the loaded software; and
with the first controller, instructing each of the switches in the first and second redundant partitions of switches to re-enable all of the ports between the first and second redundant partitions of switches after the second redundant partition of switches has finished installing the loaded software.

13. A method of using at least first and second controllers that each controls switches in a network having end hosts that are coupled to the switches, the method comprising:
with the first and second controllers, partitioning the switches into first and second sets of switches, wherein the first set of switches is connected to each of the end hosts, wherein the second set of switches is connected to each of the end hosts, wherein the first and second sets of switches each include a respective plurality of switches, and wherein the second set of switches does not include any switches from the first set of switches;
with a given one of the first and second controllers, instructing the switches to disable network connections between the first and second sets of switches;
with the first and second controllers, receiving software;
with a selected one of the first and second controllers, providing the software to the first and second sets of switches;

with the first controller, installing the software on the first controller;
with the first controller, after installing the software on the first controller, instructing the first set of switches to install the software;
with the first controller, instructing the second set of switches to install the software after the first set of switches has installed the software; and
with the second controller, installing the software on the second controller after the first and second sets of switches have both installed the software.

14. The method defined in claim 13, further comprising:
with the second controller, assigning control of the first set of switches to the first controller after the first controller has installed the software on the first controller;
with the second controller, assigning control of the second set of switches to the first controller after the first set of switches has installed the software and prior to installing the software on the second controller.

15. The method defined in claim 14, further comprising:
with the second set of switches, forwarding network packets between the end hosts while the first set of switches installs the software; and
with the first set of switches, forwarding the network packets between the end hosts while the second set of switches installs the software.

16. The method defined in claim 14, further comprising:
with the first controller, instructing the first set of switches to disable ports connected to the end hosts prior to installing the software on the first set of switches; and
with the first controller, instructing the first set of switches to enable the ports connected to the end hosts after installing the software on the first set of switches and prior to installing the software on the second set of switches.

17. A method of using at least first and second controllers that each controls switches in a network having end hosts that are coupled to the switches, the method comprising:
with the first controller, communicating with the second controller to perform a software upgrade operation on the network, wherein the switches in the network forward network traffic between the end hosts during the software upgrade operation, and wherein the first and second controllers are separate from the switches;
with the second controller, identifying first and second redundant partitions of switches in the network, wherein each of the end hosts is coupled to the first redundant partition of switches and each of the end hosts is coupled to the second redundant partitions of switches;
with the first controller, providing flow table entries to each of the switches in the first and second redundant partitions of switches;
with the first controller, installing the loaded software on the first controller;
with the first controller, instructing each of the switches in the first redundant partition of switches to install the loaded software after the first controller has finished installing the loaded software;
with the second controller, installing the loaded software after the first redundant partition of switches has finished installing the loaded software; and
with the first controller and concurrently with installing the updated software at the second controller, instructing each of the switches in the second redundant partition of switches to install the loaded software.

18. The method defined in claim 17, further comprising:
with the second controller, instructing each of the switches in the first and second redundant partitions of switches to disable all ports between the first and second redundant partitions of switches before the second controller begins installing the loaded software; and
with the second controller, instructing each of the switches in the first and second redundant partitions of switches to disable all connections with the first controller before the first controller begins installing the loaded software.

19. The method defined in claim 18, further comprising:
with the first controller, re-enabling connections between the first controller and each of the switches in the first redundant partition of switches after the first controller has finished installing the loaded software; and
with the first controller, instructing the first redundant partition of switches to disable connections with all of the end hosts after the connections between the first controller and each of the switches in the first redundant partition of switches has been enabled, wherein the first controller instructs each of the switches in the first redundant partition of switches to install the loaded software after each of the switches in the first redundant partition of switches has disabled the connections with all of the end hosts.

20. The method defined in claim 19, further comprising:
with the first controller, instructing the first redundant partition of switches to re-enable the connections with all of the end hosts after the first redundant partition of switches has finished installing the loaded software.

21. The method defined in claim 20, further comprising:
with the second controller, instructing the second redundant partition of switches to disable connections with all of the end hosts after the first redundant partition of switches has re-enabled the connections with all of the end hosts.

22. The method defined in claim 21, further comprising:
with the first controller, re-enabling connections between the first controller and each of the switches in the second redundant partition of switches after first redundant partition of switches has finished installing the loaded software.

23. The method defined in claim 22, further comprising:
with the first controller, instructing each of the switches in the second redundant partition of switches to install the loaded software after the connections between the first controller and each of the switches in the second redundant partition of switches have been re-enabled and after the connections between the second redundant partition of switches and all of the end hosts have been disabled.

24. The method defined in claim 23, further comprising:
with the first controller, instructing the second redundant partition of switches to re-enable the connections between the second partition of switches and all of the end hosts after the second redundant partition of switches has finished installing the loaded software; and
with the first controller, instructing each of the switches in the first and second redundant partitions of switches to re-enable all of the ports between the first and second redundant partitions of switches after the second redundant partition of switches has finished installing the loaded software.

* * * * *